(12) United States Patent
Harrington

(10) Patent No.: US 7,734,276 B2
(45) Date of Patent: Jun. 8, 2010

(54) RETROFIT AUTOMOBILE RADIO FOR OLDER AUTOMOBILES

(76) Inventor: Steven L. Harrington, 3106 N. Puente St., Fullerton, CA (US) 92835

( * ) Notice: Subject to any disclaimer, the term of this patent is extended or adjusted under 35 U.S.C. 154(b) by 473 days.

(21) Appl. No.: 11/804,600

(22) Filed: May 18, 2007

(65) Prior Publication Data

US 2008/0283682 A1 Nov. 20, 2008

(51) Int. Cl.
*H04B 1/16* (2006.01)
(52) U.S. Cl. ........................ 455/345; 455/348
(58) Field of Classification Search ............... 455/90.1, 455/90.3, 345, 346, 347, 351, 34; 248/27.1–27.3; 361/679, 814
See application file for complete search history.

(56) References Cited

U.S. PATENT DOCUMENTS

| | | | |
|---|---|---|---|
| 3,390,338 A | 6/1968 | Race | |
| 3,685,879 A | 8/1972 | Tsuji | |
| 3,906,371 A | 9/1975 | Tsuji | |
| 3,922,047 A | 11/1975 | Tsuji | |
| 4,045,739 A | 8/1977 | Kawasaki | |
| 4,050,663 A | 9/1977 | Rogers | |
| 4,053,130 A | 10/1977 | Birkner | |
| 4,067,654 A | 1/1978 | Maniaci | |
| 4,462,564 A | 7/1984 | Alves et al. | |
| 4,560,124 A | 12/1985 | Alves et al. | |
| 4,738,420 A | 4/1988 | Angle et al. | |
| 4,742,978 A | 5/1988 | Ponticelli | |
| 4,895,326 A | 1/1990 | Nimpoeno | |
| 4,911,386 A | 3/1990 | Putman et al. | |
| 5,467,947 A | 11/1995 | Quilling, II | |
| 5,887,829 A | 3/1999 | Wong et al. | |
| 5,895,016 A * | 4/1999 | Blackburn | 455/345 |
| 6,651,936 B2 | 11/2003 | Upson et al. | |

* cited by examiner

*Primary Examiner*—Thanh C Le
(74) *Attorney, Agent, or Firm*—Thorpe North & Western LLP

(57) ABSTRACT

A replacement or retrofit radio which can be used to replace a wide range of older automobile radios and fit into an almost unlimited number of dashboard configurations comprises a radio case or enclosure having a display sized to fit into most original automobile dashboard radio display openings. Separate control knob shafts and associated controls are provided electrically connected to the radio via relatively long cables. With separate control knob shafts, there is no limit to where the controls and shafts are placed with respect to the radio case and display. A selected set of brackets can be attached to the radio with the selected set of brackets providing adjustable physical mounting of the control knob shafts to the brackets and physical connection of the control knob shafts to the radio. This allows mounting of the radio in the dashboard of the automobile in the usual manner of tightening nuts onto threaded control knob shaft sleeves.

20 Claims, 7 Drawing Sheets

RETROFIT AUTOMOBILE RADIO FOR OLDER AUTOMOBILES

BACKGROUND OF THE INVENTION

1. Field

The present invention relates generally to automobile radio receiver apparatus and particularly to replacement radio receiver apparatus having adjustable means for varying the spacing between the radio enclosure and the control elements so as to be capable of adapting to existing cutouts and control element apertures in automobile dashboards.

2. State of the Art

Radios have been a standard accessory in automobiles for decades and are generally mounted in the automobile dashboard. An automobile radio will generally include a radio case or enclosure having a display extending therefrom or mounted therein to display to a user the radio setting, and will generally also have a pair of control knob shafts extending therefrom for mounting control knobs for controlling and changing the settings of the radio. Usually one knob will control the volume of the radio and a second knob will control the tuning of the radio. Newer automobile radios may also include tape players and/or CD players.

Car radios, particularly car radios from the 1950's through the 1980's, generally have a face plate forming the front of the radio case or enclosure or mounted to the front of the radio case or enclosure, with the radio display and the control knob shafts for the control knobs extending from the face plate. The control knob shafts will generally include threaded control knob shaft sleeves extending from the radio through which the control knob shafts extend. To mount these radios in the dashboard of an automobile, the dashboard will generally provide a display opening to receive the radio display and shaft openings to simultaneously receive the pair of control knob shafts with respective control knob shaft sleeves extending from the radio. The radio is then secured in the dashboard by nuts screwed onto the control knob shaft sleeves from the front of the dashboard to secure the radio face plate and the radio case to the back of the dashboard. Thus, the dashboard is sandwiched between the radio face plate and the nuts tightened onto the threaded control knob shaft sleeves, which securely hold the radio in place in the dashboard. When mounted in the dashboard, the radio display will fit into the display opening in a manner so that it can be seen by a user and the control knob shafts for the control knobs will extend through the shaft openings and sleeves so that control knobs mounted on the shafts are accessible to a user to control the radio thus mounted. A back strap may sometimes also be used to secure and stabilize the back of the radio case or enclosure in position behind the dashboard.

As indicated, automobile radios are generally mounted in automobile dashboards. However, each model of automobile generally has a different dashboard design and usually dashboard designs change from year to year or at least every several years. With each new dashboard design, the size and placement of the radio display and the positioning of the control knobs for the radio are changed. Thus, over the last fifty or more years, hundreds of different dashboards with different display configurations and locations and different control knob shaft placements have been produced. Generally, each of the different dashboard designs with different display configurations and locations and different control knob shaft placements were accompanied by a different radio specifically configured to fit the particular dashboard design. The particular radios in the configurations to fit these many dashboards have long been out of production.

Radios do not last forever, and further, in recent years, there have been many improvements to automobile radios. Many older car drivers and classic car owners wish to replace the original radio in their vehicle with a new radio, either to provide a radio that works if the original radio has stopped working, or to provide a new radio with the additional features of more modern radios. Unfortunately, new original equipment replacement radios are not available for older cars, and further, new after market replacement radios to fit the many old dashboard radio configurations generally are not available.

There have been past attempts to provide replacement radios that provide adjustability of the spacing of the control knob shafts in order to allow the radio to fit a number of different dashboard radio (display opening and shaft opening) configurations. These radios generally have face plates with slots in which the control knob shafts are slidably mounted so their position can be adjusted to the extent allowed by the slots. For example, U.S. Pat. Nos. 4,067,654 and 3,906,371 both show radios with face plates with openings for the control knob shafts to pass through that are large enough to allow adjustment of the position of the shafts with respect to the radio case and display in both spacing and height in order to have one radio that can be adjusted to fit into a number of different automobile dashboards. Positioning plates are provided to locate the shafts in an adjusted fixed position in the face plate so as to fit a desired dashboard configuration in a desired car. U.S. Pat. No. 3,685,879 shows portions of the radio case from which the control knob shafts extend that slide in and out to adjust the spacing between the control knob shafts to fit different dashboard shaft opening configurations. However, the range of differences in mounting configurations for radios in the dashboards of older cars is very great and the limited adjustability in spacing and height of the control knob mounting shafts provided by the prior art will only cover a limited number of radio configurations. Thus, although these prior art replacement radios can fit a number of different dashboard arrangements, it is only a limited number of dashboard configurations.

The problem still exists of providing a replacement radio for older automobiles that will fit a wide range of older automobile dashboard arrangements and make replacement radios available for use with most older cars. The availability of replacement radios for older cars is becoming more of a problem as the number of particular older cars in need of such replacement radios becomes more limited. Thus, it is becoming almost impossible for classic and antique car owners to find replacement radios for their cars.

SUMMARY OF THE INVENTION

According to the invention, a replacement radio which can be used to replace a wide range of older automobile radios and fit into an almost unlimited number of dashboard configurations comprises a radio case having a display sized to fit into most radio display openings. Separate control knob shafts and associated controls are provided electrically connected to the radio via relatively long cables or to be electrically connected to the radio via cables and plugs. With separate control knob shafts, there is no limit to where the controls and shafts are placed with respect to the radio case and display. The radio also includes means for mounting selected sets of brackets to the radio with each selected set of brackets providing adjustable physical mounting of the control knob shafts to the brackets and physical connection of the control knob shafts to the radio. This allows mounting of the radio in the dashboard of the automobile in the usual manner of tightening nuts onto the threaded control knob shaft sleeves. Different sets of mounting brackets can be provided with the radio so a user picks the appropriate set of brackets from the sets of brackets to appropriately position the control knob shafts with respect to the radio for the particular dashboard design configuration to which the radio is being matched. By providing for attachment of brackets to the radio so that different sets of brackets can be selected for attachment to the radio, a range of different sets of brackets can be provided which will then allow a user to select the set of brackets appropriate for widely differing arrangements and spacings of control knob shaft openings. Each different bracket set also has a range of adjustability for adjusting control knob shaft mounting within the control knob shaft arrangement covered by the brackets. Each set of brackets will provide a range of adjustment for the shafts approximately equal to the range of adjustment provided by prior art face plates, with each set of brackets essentially providing a separate adjustable face plate to the radio. This allows the user to provide a much wider range of control knob shaft configurations for the radio than previously available in the prior art. With the separate controls, there is no limit to where the controls and shafts are placed. Further, with separate control knob mounting shafts and associated controls, the controls and shafts can even be mounted completely separately from the radio and be connected to the radio by whatever length cable is needed. In such instances, the radio can be mounted through appropriate brackets directly to the dashboard or to another part of the automobile.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENTS

Figure 1:
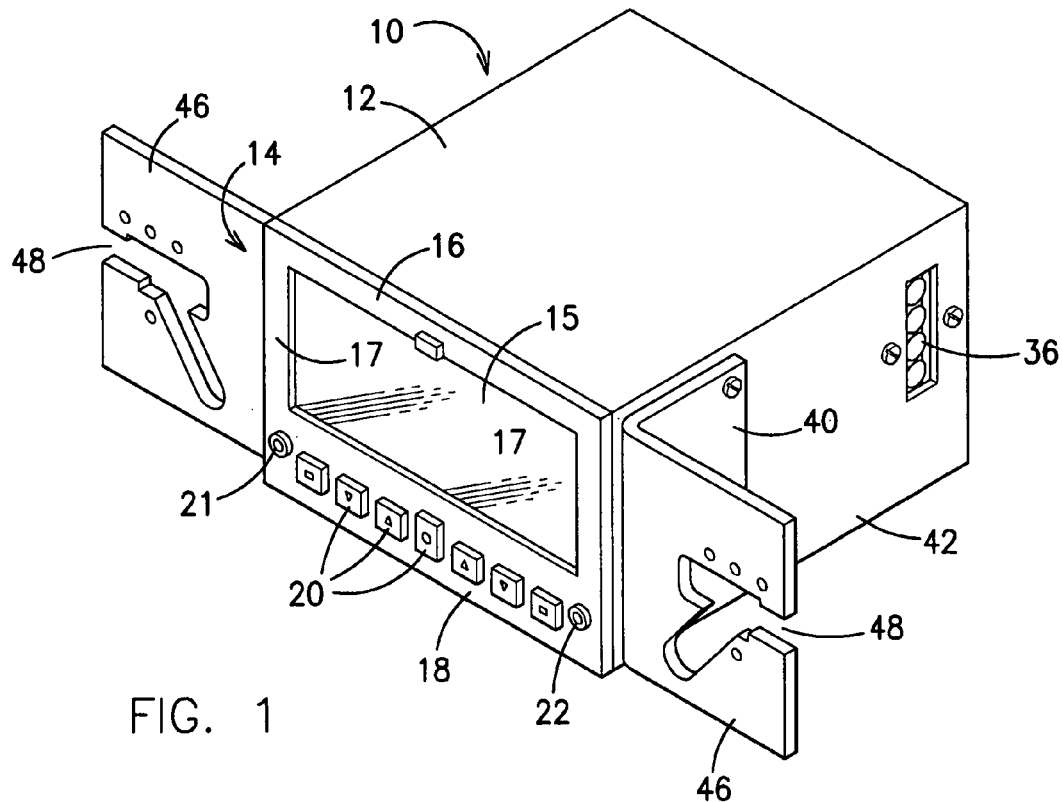
FIG. 1 is a front top left corner perspective view of an embodiment of an example of an automobile radio of the present invention.
Figure 2:
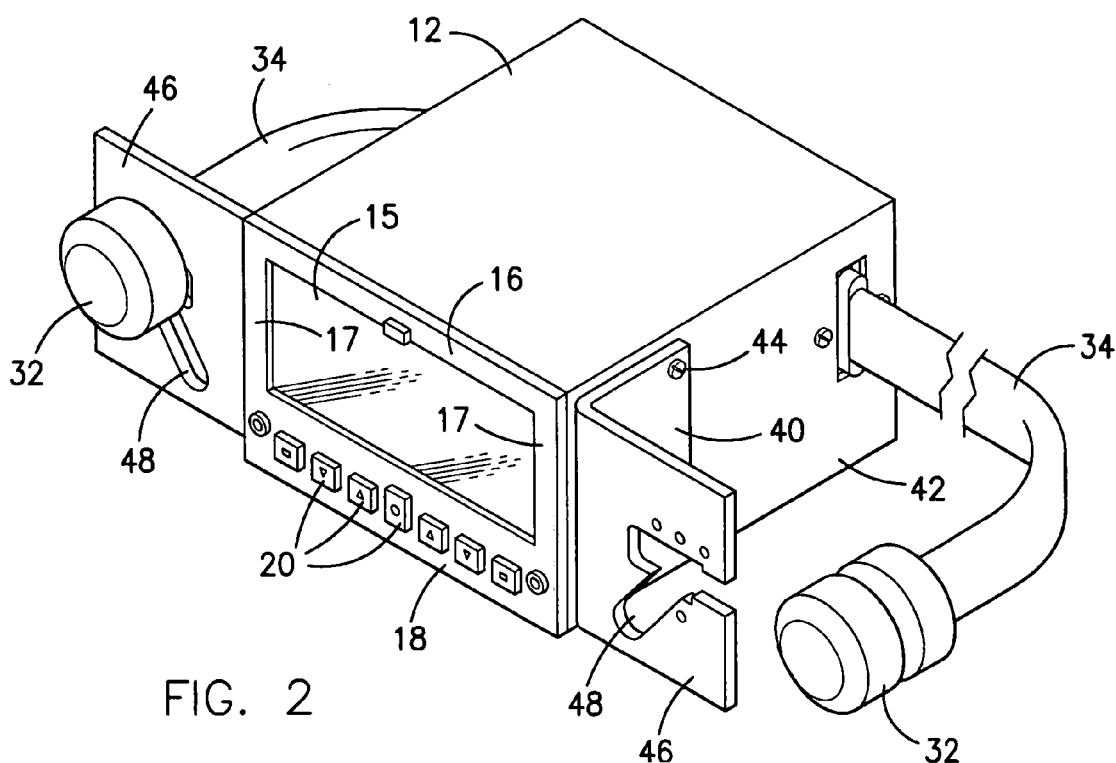
FIG. 2 is a similar perspective view showing control knob shafts and controls attached to the radio of FIG. 1.
Figure 3:
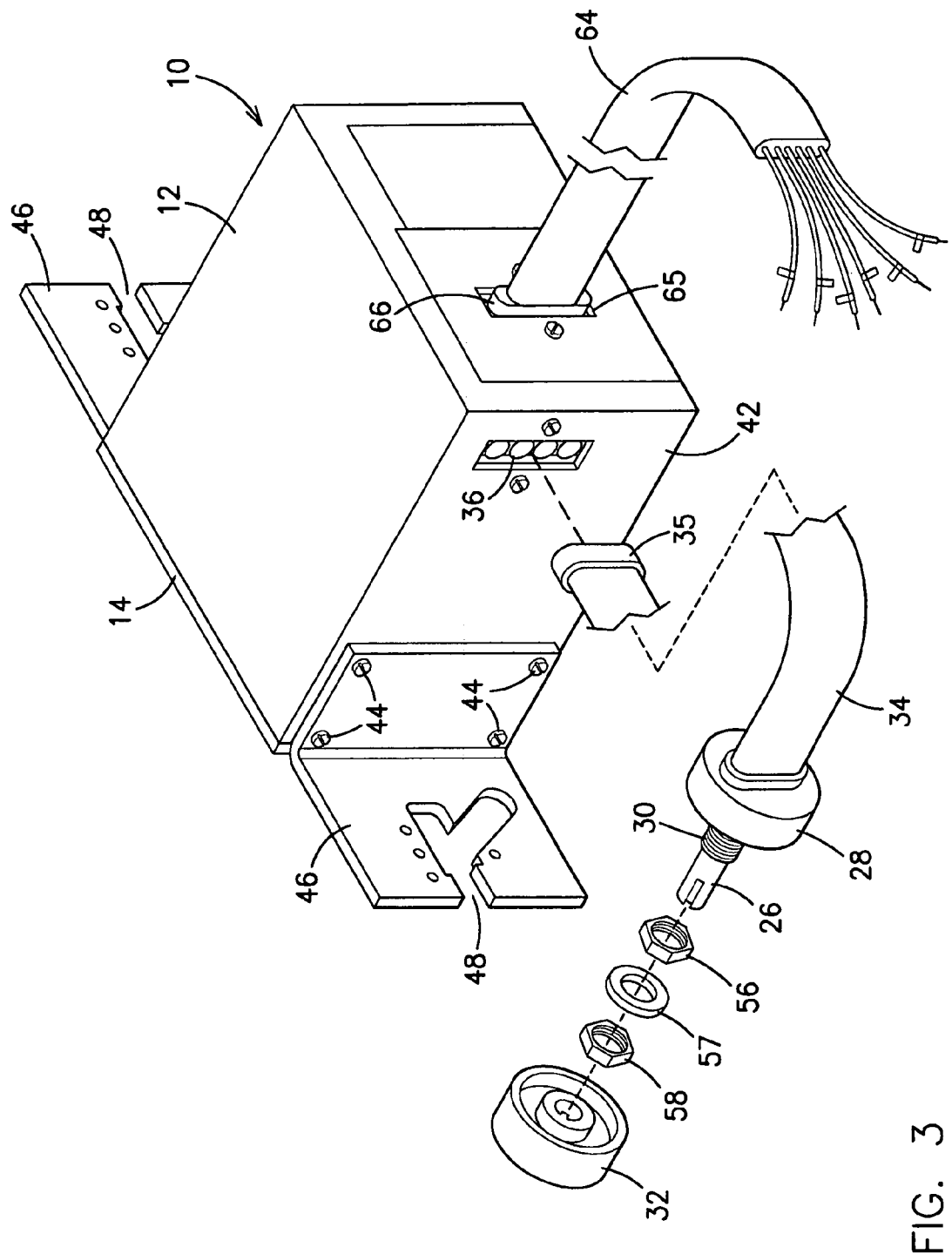
FIG. 3 is a rear top left corner perspective view of the radio of FIG. 1.
Figure 4:
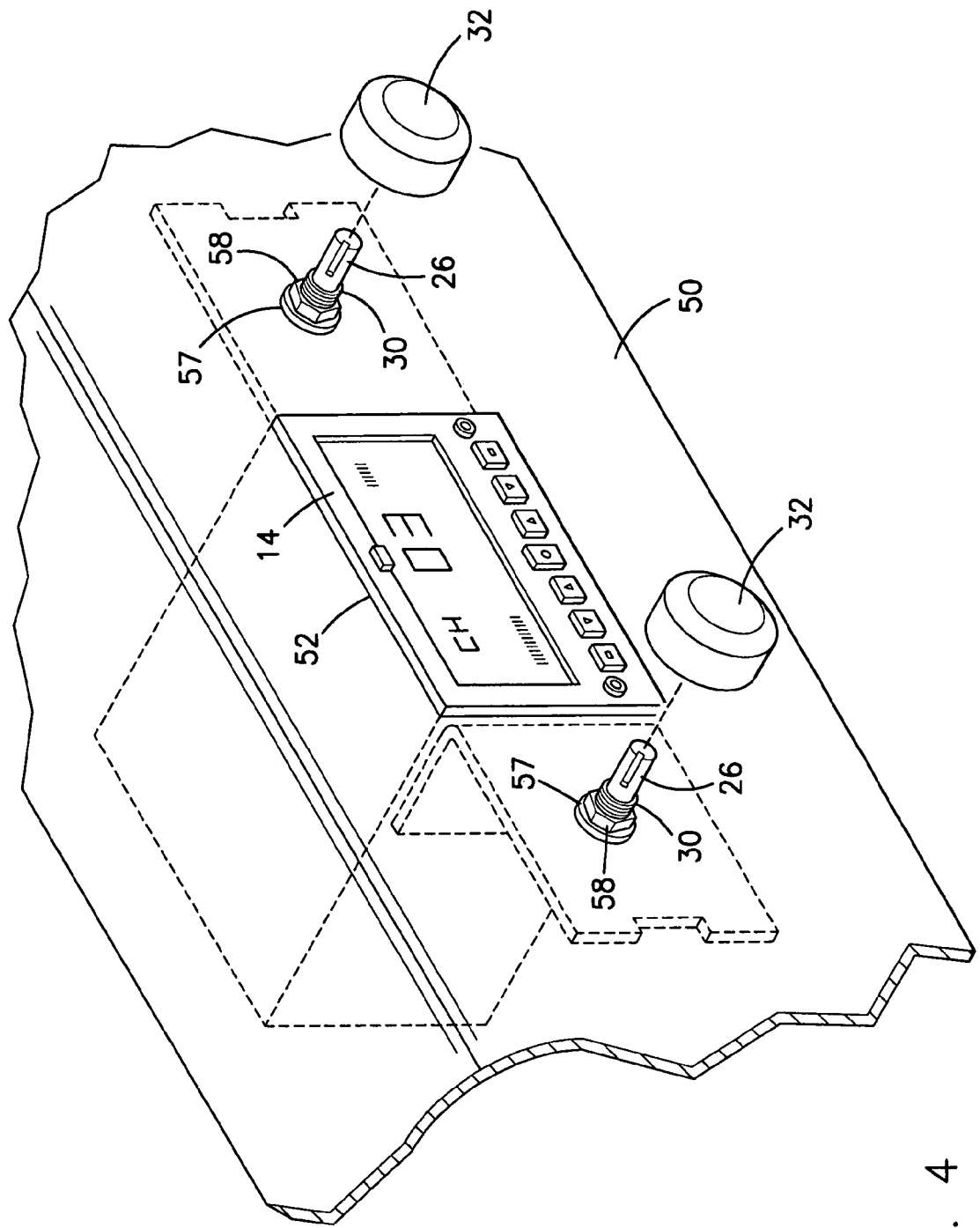
FIG. 4 is a fragmentary perspective view of an automobile dashboard showing the installation of the replacement radio.

An example of a replacement radio of the invention, indicated generally as 10, FIGS. 1-3, includes a case or enclosure 12 having a display 14 forming the front thereof. The display 14 includes not only a display window or screen 15, but also the edges, i.e., top edge 16, opposite side edges 17, and bottom edge 18 around the screen with control buttons 20 extending from the bottom edge 18. The display 12 is sized so as to fit into the smallest expected size of dashboard display opening for which the radio will be expected to fit. Therefore, although the display 14 is shown as coextensive with and forming the entire front of case 12, the display may be configured to be much smaller in size in relation to the front of case 12 so will take up only a portion of the front of case 12. Since the display 14 will be sized to fit into the smallest expected dashboard display opening, there will be many dashboard display openings that will be larger than the display 14 extending from the front of radio case 12. Where the display 14 is smaller than the dashboard display opening into which it is placed, various types of fillers or covers can be used to fill or cover the area between the edges of the display 14 and the edges of the dashboard display opening into which the display 14 is inserted. Buttons 20 extending from the bottom edge 18 of the display 14 can be used for various function controls, for example, for switching radio stations or for various CD and/or tape player controls. Replacement radio 10 can include various functions such as CD and/or tape players that did not exist in the original radio that the replacement radio 10 is replacing. In addition to buttons 20, the display 14 can also include a sound signal input jack 21 and a headphone output jack 22. The buttons 20, input jack 21, and output jack 22 can be located in any desired position in display 14, not just along the bottom edge 18.

The replacement radio 10 includes control knob shafts 26, FIG. 3, extending from associated control housings 28 and having a threaded sleeve 30 around the portion of the control knob shaft 26 as it extends from the control housing 28. Control knobs 32 fit onto the end of control knob shafts 26. Connecting wires, such as ribbon wire or cable 34, extends from control housing 28 to radio case 12 to electrically connect the controls in control housing 28, which are operated by control knob shafts 26, to the rest of the radio. The connecting wire 34 can be permanently connected into the radio within case 12, or can be removably connected through plug 35 on an end of cable 34 to receiving socket 36 in radio case 12. As can be seen, with the control knob shafts and associated controls completely separate from the case and connected by cable to the radio case, they are free to be moved and positioned as necessary to fit into receiving dashboard shaft openings.

In the embodiment illustrated, replacement radio 10 also includes means for attaching brackets to the radio case 12 which brackets will form means for attaching the radio to the dashboard or other part of the automobile into which the radio is to be installed. The brackets shown are L brackets 40 which are attached to opposite sides 42 of radio case 12 by, for example, screws 44 extending through brackets 40 and screwed into respective radio sides 42. In this case, the screws 44 and the receiving holes in the brackets 40 and radio sides 42 form the means for attaching the brackets to the radio case. One leg 46 of each L brackets 40 extends outwardly from the front of radio case 12. As shown, the legs 46 extend from the front of radio case 12 in opposite directions. These bracket legs can mount the control knob shaft sleeves 30 which then are used to mount the radio 10 in the dashboard in usual manner. Bracket legs 46 include slots 48 which slidingly receive shaft sleeves 30 therein so that shaft sleeves 30 and control knob shafts 26 can be adjustably positioned at any location along the slots 48.

Figure 7:
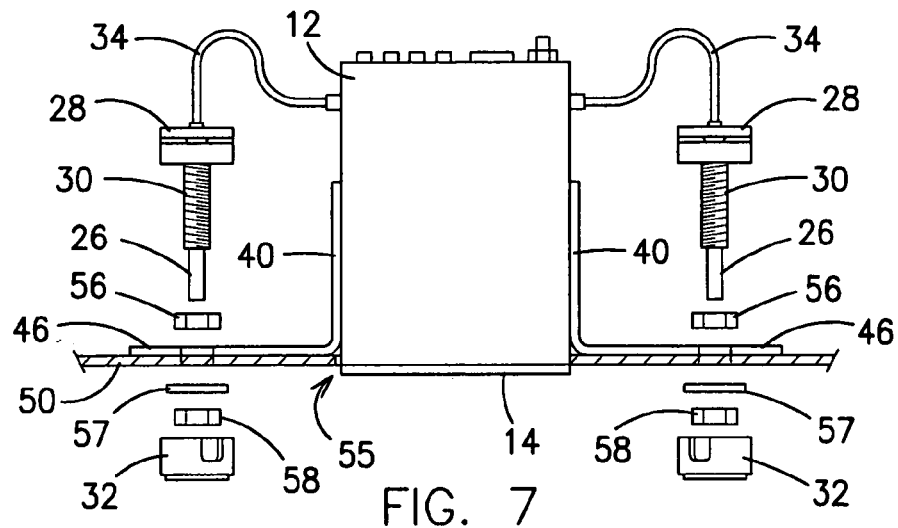
FIG. 7 is a fragmentary horizontal section through the dashboard of FIGS. 4-6 above the radio showing a top view of the radio being installed with the radio case in position in the dashboard and the control knob shafts not yet extended through the dashboard.
Figure 8:
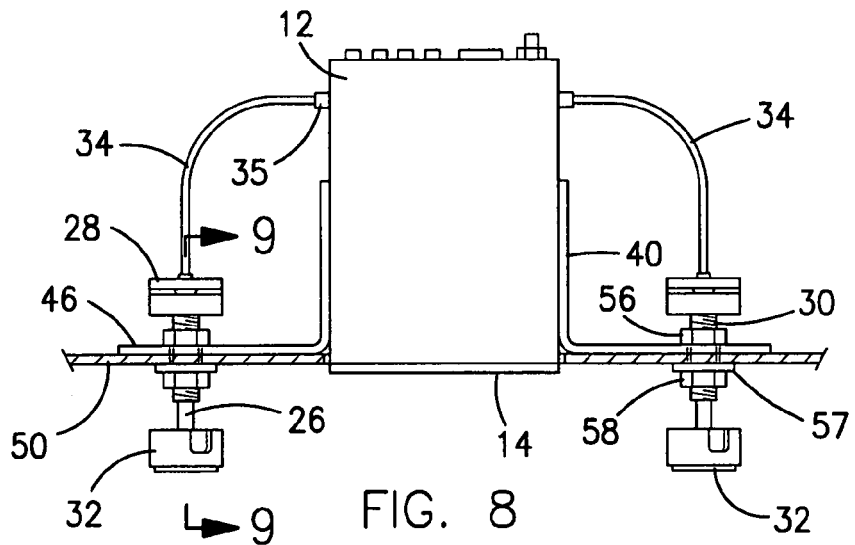
FIG. 8 is a fragmentary horizontal section through the dashboard similar to that of FIG. 7, but showing the control knob shafts installed.
Figure 9:
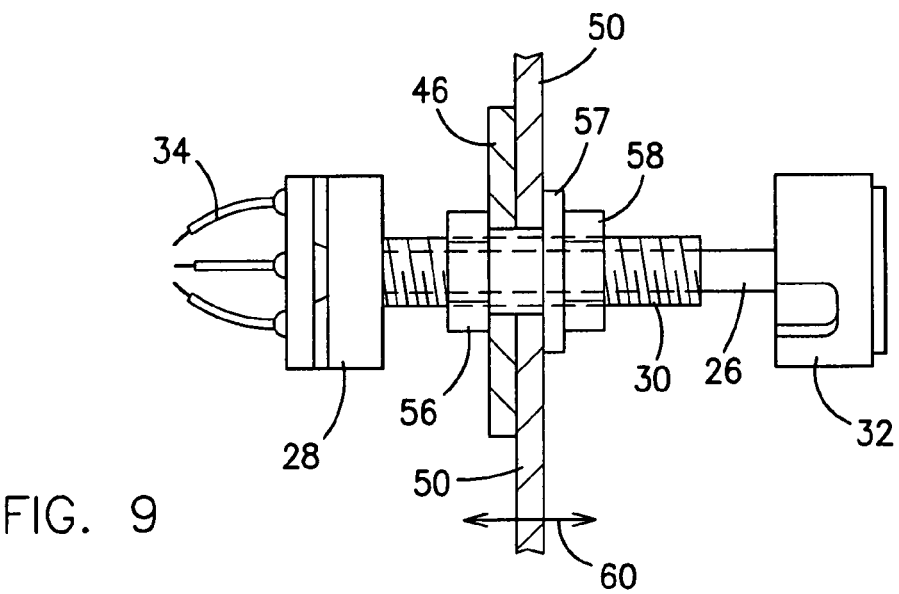
FIG. 9 is a vertical section through the dashboard of FIGS. 4-6, taken on the line 9-9 of FIG. 8, showing an installed control knob shaft in elevation.

The replacement radio of the invention will usually be mounted in the dashboard of an automobile in substantially the same manner in which the original radio was mounted. FIGS. 4-9 show a portion 50 of an automobile dashboard into which a replacement radio 10 of the invention has been mounted as a replacement for the original radio. The dashboard 50 includes a display opening 52 which receives the replacement radio display 14 therethrough and shaft openings 54, FIG. 5, which receive the control knob shafts 26 and surrounding sleeves 30 therethrough. To install the replacement radio, a set of L brackets is selected to be attached to the radio case 12 that will allow the proper spacing and positioning of the control knob shafts 26 with respect to the radio display 14 so that when the radio is positioned behind the dashboard with the display 14 positioned directly behind the display opening 52 in the dashboard 50, the control knob shafts 26 will be positioned behind the dashboard in alignment with the dashboard shaft openings 54. The selected brackets will be attached to the radio case 12. The replacement radio will be moved behind the dashboard 50 as shown by FIG. 7 so that the display 14 extends into the display opening 52. Control knob shafts 26 and shaft sleeves 30 are extended through shaft openings 54. Before extending shafts 26 through shaft openings 54, nuts 56 are screwed onto threaded sleeves 30, FIGS. 8 and 9, and are positioned on sleeve 30 so as to adjust the amount of extension of shafts 26 beyond the front of dashboard 50. The shafts 26 are then inserted through the slots 48 in bracket legs 46 and through shaft openings 54 in dashboard 50 so that nut 56 abuts against the back surface of bracket legs 46. With the shafts 26 and sleeves 30 extending through shaft openings 54, washers 57 are placed on sleeves 30 in front of dashboard 50 and nuts 58 are tightened onto sleeves 30 to sandwich dashboard 50 against bracket leg 46 between nuts 56 and 58. As shown by arrow 60, FIG. 9, this mounting allows for mounting of the shafts 26 on various widths of dashboards 50. Because the bracket portion 46 is sandwiched against the back of dashboard 50 securely between nuts 56 and 58, and because bracket 40 is attached to radio case 12, radio 10 is securely attached to the dashboard 50. To complete the installation, knobs 32 are pushed onto the ends of shafts 26, and a wiring harness 64 with end plug 65 is plugged into socket 66 in the back of radio case 12 to connect the radio to a source of power, the battery in the automobile, and to the speakers in the automobile. An antenna can also be connected through wiring harness 64, or can be connected separately to the radio.

Figures 5, 6:
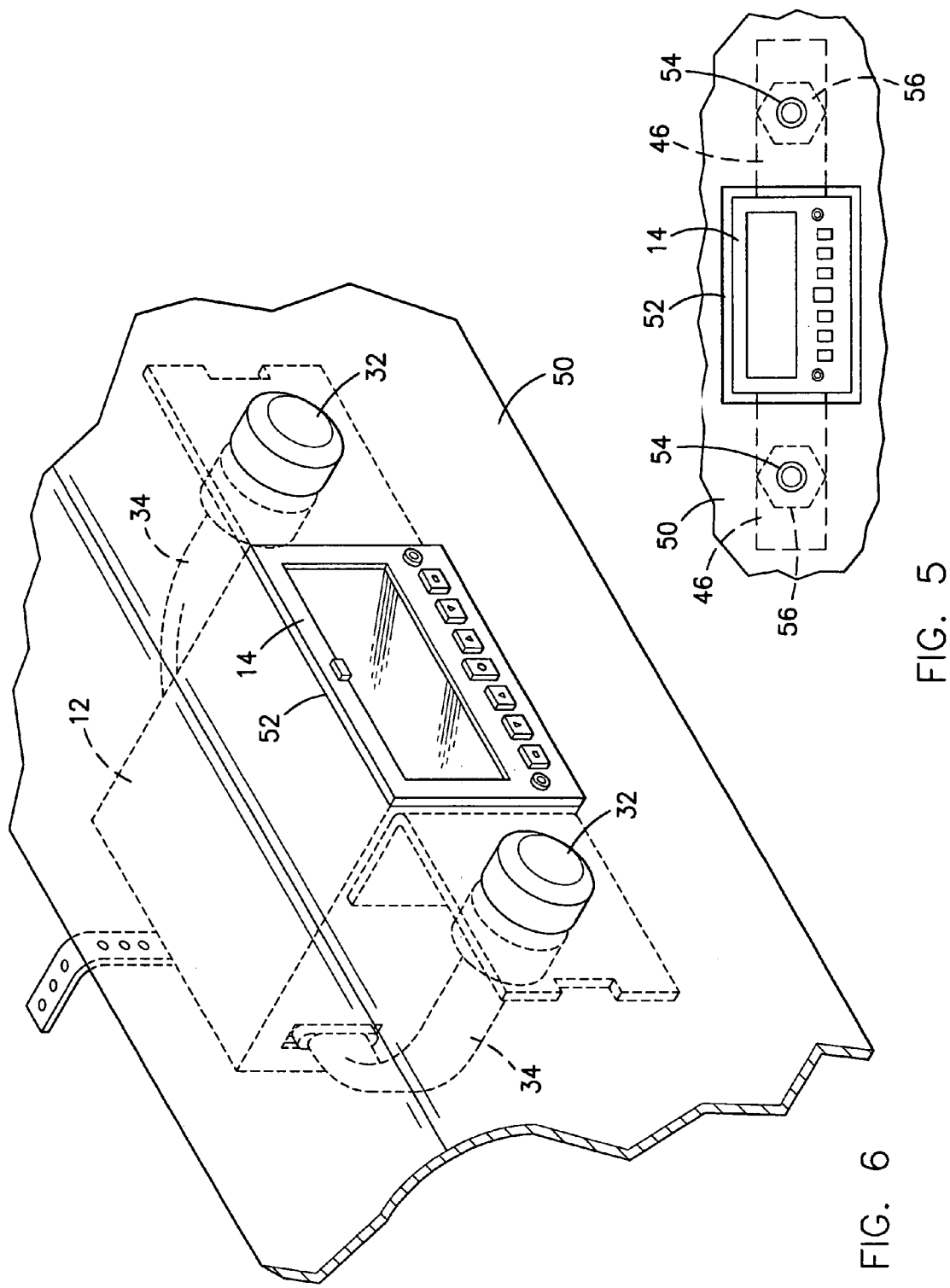
FIG. 5 is a fragmentary front elevation of a portion of the dashboard of FIG. 4, showing radio mounting dashboard openings and showing in broken lines a replacement radio positioned behind the dashboard.
FIG. 6 is a fragmentary perspective view of the dashboard of FIGS. 4 and 5 showing a replacement radio installed in the dashboard, but without the display cover.
Figure 10:
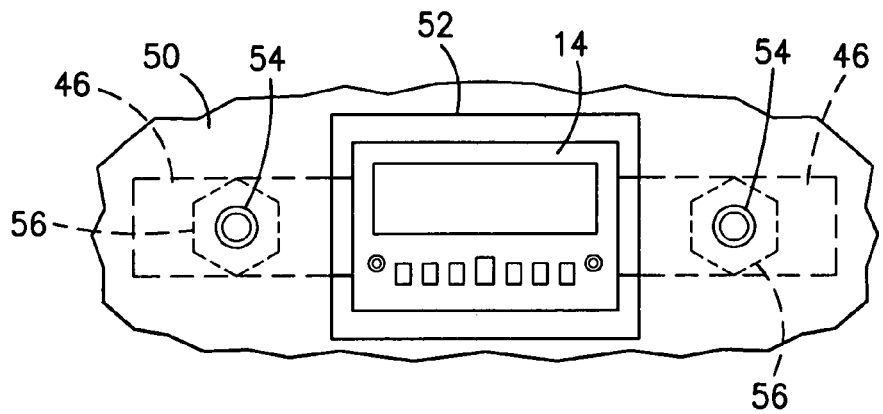
FIG. 10 is a fragmentary front elevation of a portion of the dashboard similar to FIG. 5, showing a radio display opening larger than the radio display and a space between the radio display and the dashboard display opening.
Figure 11:
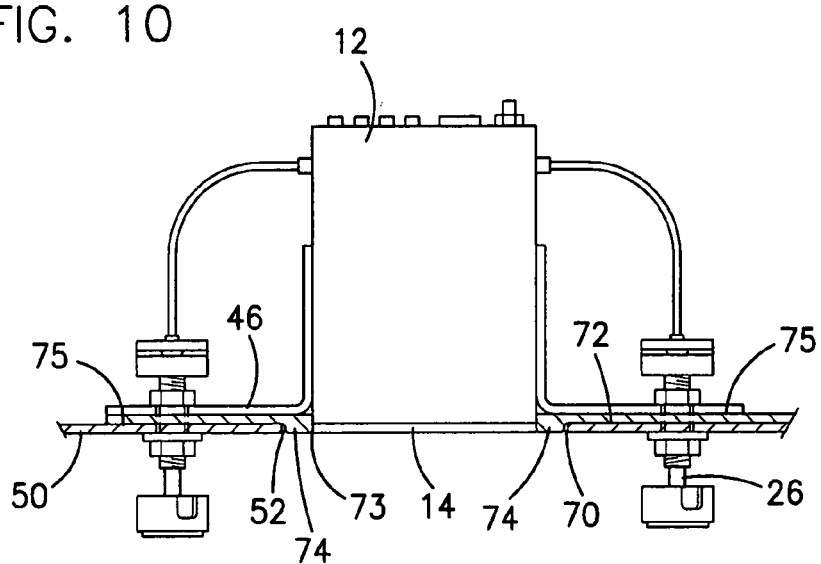
FIG. 11 is a fragmentary horizontal section through the dashboard of FIG. 10 above the radio showing a top view of the radio installed with a filler plate also installed between the radio brackets and the dashboard to fill the space between the radio display and the dashboard display opening.

As indicated, radio display 14 is made to fit into the smallest dashboard display opening that it is expected the radio will need to fit. Therefore, in many or most installations, the radio display 14 will be smaller than the dashboard display opening 52 with which the radio will be used. This situation is shown in FIG. 10, wherein the dashboard display opening 52 is larger than opening 52 as shown in FIG. 5, and is therefore larger than radio display 14. Because of this, there is a gap 70 extending between the inside edges of the dashboard opening 52 and the outer perimeter of radio display 14. This gap 70 is unsightly. Therefore, special filler or face plates can be molded and provided for particular models of automobiles to fit between the radio display 14 and the edges of the dashboard display opening to disguise this gap and provide a finished look to the radio. For example, a special face plate 72, FIG. 11, can be formed to have an opening 73 to closely fit around the replacement radio display 14 and have a raised portion 74 which extends in and fills space 70. A flat plate portion 75 of the special face plate 72 extends to the control knob shaft openings. In this way, the special face plate 72 is securely held in position around radio display 14 when the radio is installed in an automobile dashboard.

Figure 12:
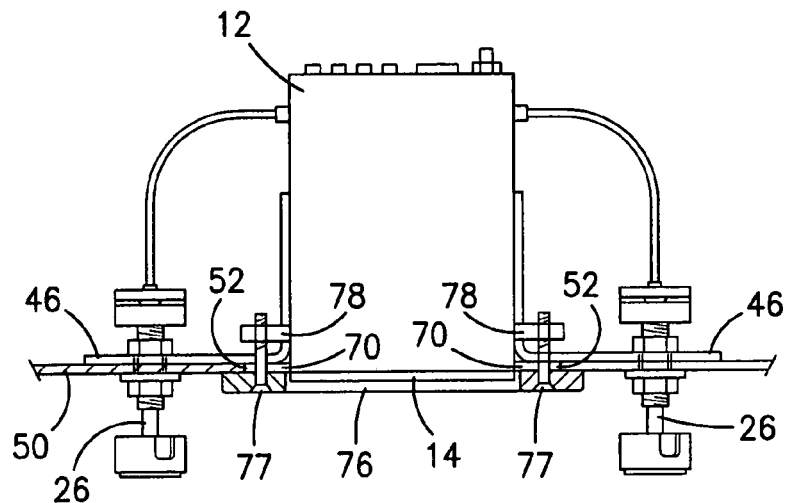
FIG. 12 is a fragmentary horizontal section through the dashboard of FIG. 10 above the radio showing a top view of the radio installed with a cover installed to cover the space between the radio display and the dashboard display opening.

FIG. 12 shows an alternate face plate in the form of a cover plate 76 which is secured over gap 70 and over the dashboard around the display opening 52 to cover and disguise the gap 70. Again, the cover plate has an opening to fit closely around the radio display 14 and is held in place by screws 77 which can be threaded into tabs 78 extending from radio case 12 in space 70. Cover plate 76 covers any gap present between the perimeter edges of radio display 14 and the inside edges of dashboard display opening 52 to provide a finished appearance to the radio installation. The cover plate 76, as shown, extends beyond the edges of the dashboard display opening 52 so a single size cover plate 76 can be used with various automobiles having different size gaps 70. Various other forms of cover plates can be supplied and used to give the display a finished appearance.

While the radio of the invention can be made in various sizes, it has been found that a radio with a case size of about four inches by about two and one-eighth inches and a depth of about five inches is satisfactory to fit behind the dashboard of most cars. The portion 46 of the L bracket extending from the front sides of the radio case 12 can extend about two inches from the sides of the radio case and can be about the same two and one-eighth inches in height as the height of the radio. The display 14 can be coextensive with the front of the radio case so can be about two inches wide and about two and one-eighth inches high and the l brackets can be placed so that the display will extend about five millimeters beyond the front of bracket leg extending outwardly from the radio case. Thus, the display will extend about five millimeters into the dashboard display opening. The cables connecting the control knob shafts and associated controls can be about ten inches long.

Figure 13:
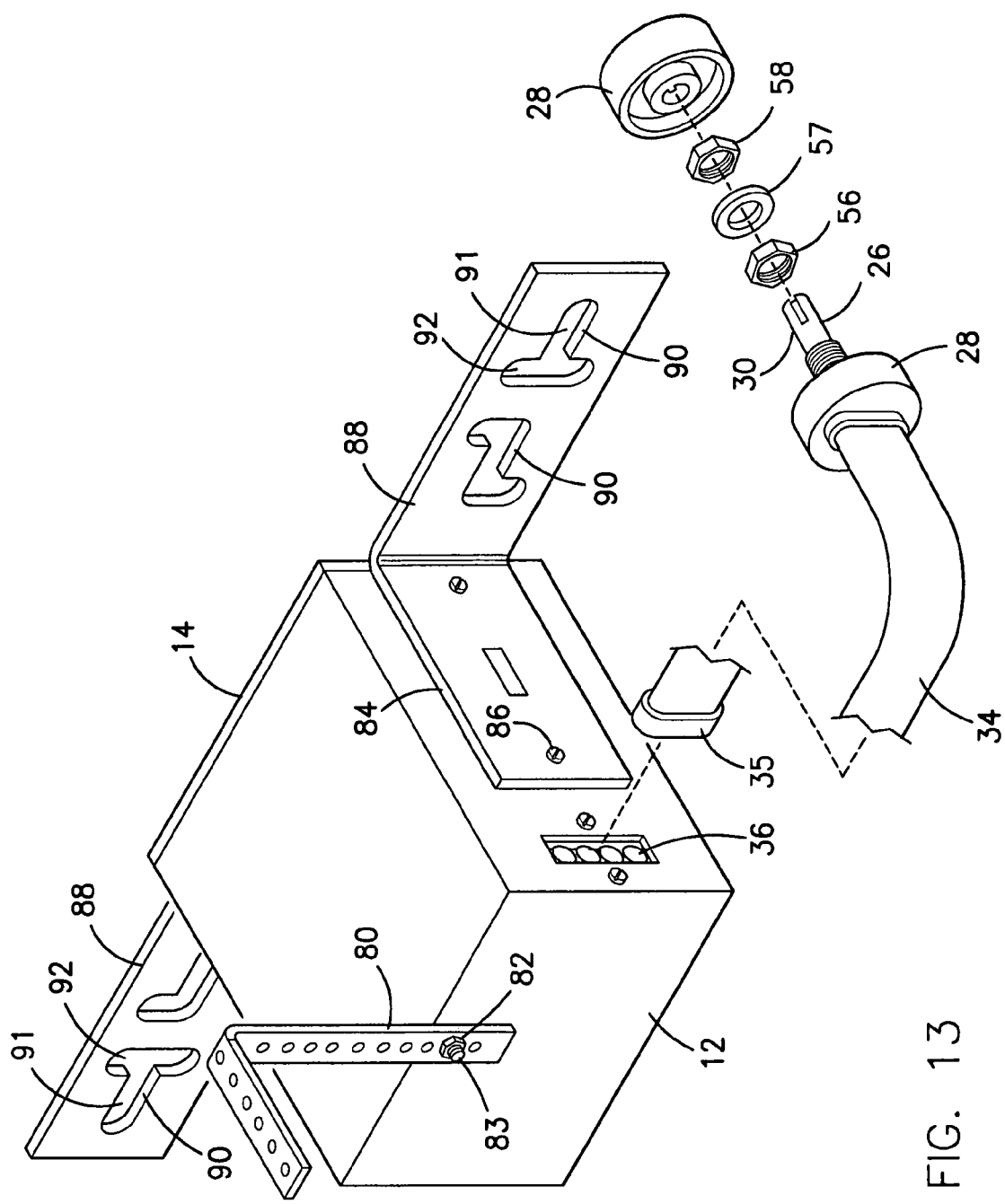
FIG. 13 is a rear top right corner perspective view of a radio of the invention showing a different mounting bracket and a backstrap.

FIG. 13 shows a slightly different embodiment of the radio of the invention where a backstrap 80 supports and stabilizes the back of the radio case and a different configuration of L bracket is used. Backstrap 80 is secured to the back of radio case 12 by nut 82 threaded onto stud 83 extending from the back of radio case 12. Backstrap 80 extends upwardly and connects in a connection not shown to the dashboard or to another part of the automobile. L bracket 84 is attached to radio case 12 by screws 86 and relatively long bracket legs 88 include slots 90 which extend both horizontally as at 91 and vertically as at 92 to provide a variety of adjustments for mounting control knob shaft 26.

While the radio has been shown as mounted using L brackets to which the control knob shafts are also attached, various other types of brackets can be used to secure the radio to the dashboard, and brackets can be used without the control knob shafts attached. The control knob shafts can be attached independently to the dashboard. While the radio can be supplied with several different sets of brackets allowing attachment of the radio to the a wide variety of automobile dashboards, where the radio is to be attached to a dashboard of an automobile with openings where existing brackets will not provide a fit, a user can make a custom bracket.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A retrofit radio for replacing an original vehicle radio in an original vehicle dashboard having an original radio display opening and a plurality of original control element openings, comprising:
   a retrofit radio enclosure having a radio display sized and positioned to fit into a range of sizes of original radio display openings;
   a means for securing the retrofit radio enclosure in the vehicle dashboard;
   a plurality of retrofit control elements separate from the retrofit radio enclosure sized and configured to fit through the plurality of original control element openings in the dashboard; and
   means for operatively connecting the plurality of separate retrofit radio control elements to the retrofit radio enclosure.

2. The retrofit radio of claim 1, wherein the means for securing the retrofit radio enclosure in the vehicle dashboard further comprises an adjustable mounting bracket attachment for attaching one or more adjustable radio mounting brackets to the retrofit radio.

3. The retrofit radio of claim 2, wherein the one or more adjustable radio mounting brackets attached to the retrofit radio enclosure also attach to the separate retrofit radio control elements.

4. The retrofit radio of claim 3, wherein the retrofit radio enclosure is at least partially supported in the vehicle dashboard by the adjustable radio mounting brackets attached to the separate retrofit radio control elements.

5. The retrofit radio of claim 1, wherein the one or more adjustable radio mounting brackets further comprise separable supporting L-brackets.

6. The retrofit radio of claim 5, wherein the separable supporting L-brackets are interchangeable.

7. The retrofit radio of claim 5, wherein the separable supporting L-brackets are available in a set having a variety of standard slot configurations.

8. The retrofit radio of claim 5, wherein the separable supporting L-brackets are custom built from a blank.

9. A replacement vehicle radio to replace an original vehicle radio mounted in a vehicle dashboard having a dashboard radio display opening and a plurality of dashboard shaft openings, the original vehicle radio having an original radio case, an original radio display fitting into the dashboard radio display opening and a plurality of original control knob shafts extending from the original radio case through the dashboard control shaft openings in the vehicle dashboard, and by which the original radio can be mounted to the dashboard, comprising:
   a replacement radio having a replacement radio case and a replacement radio display, the replacement radio display sized and positioned to fit into the smallest size of dashboard display opening in which it is expected the replacement radio will be placed;
   a plurality of replacement radio controls separate from the replacement radio case each replacement radio control having a radio control knob shaft sized and configured to fit through the dashboard shaft openings in the vehicle dashboard;
   means operatively connecting the plurality of replacement radio controls to the replacement radio in the replacement radio case; and
   mounting bracket attachment means for attaching one or more replacement radio mounting brackets to the replacement radio case for securing the replacement radio in the vehicle dashboard.

10. A replacement vehicle radio according to claim 9, wherein the means operatively connecting the plurality of replacement radio controls to the replacement radio in the replacement radio case are lengths of electrical cable.

11. A replacement vehicle radio according to claim 10, wherein a separate length of electrical cable connects each of the replacement radio controls of the plurality of replacement radio controls to the radio in the replacement radio case.

12. A replacement vehicle radio according to claim 11, wherein each of the lengths of electrical cable connect to the replacement radio in the replacement radio case via a plug and socket.

13. A replacement vehicle radio according to claim 10, wherein the plurality of replacement radio controls is a pair of replacement radio controls.

14. A replacement vehicle radio according to claim 9, wherein each of the replacement radio control knob shafts includes a threaded replacement radio control knob shaft sleeve, and wherein the replacement radio control knob shafts are secured in the dashboard shaft openings by a nut screwed onto the threaded replacement radio control knob shaft sleeve.

15. A replacement vehicle radio according to claim 14, wherein the replacement radio control knob shafts are secured in the dashboard shaft openings by sandwiching the dashboard between nuts screwed onto the threaded control knob shaft sleeves.

16. A replacement vehicle radio according to claim 15, additionally including mounting brackets attached to the replacement radio case by the mounting bracket attachment means; wherein the replacement radio control knob shafts are secured to both the dashboard and the mounting brackets to thereby attach the replacement radio case to the dashboard.

17. A replacement vehicle radio according to claim 9, additionally including mounting brackets attached to the replacement radio case by the mounting bracket attachment means.

18. A replacement vehicle radio according to claim 17, wherein additionally the replacement radio control knob shafts are secured to the mounting bracket and to the dashboard to thereby secure the replacement radio in the dashboard.

19. A replacement vehicle radio according to claim 9, wherein the dashboard display opening has an inside edge, and additionally including a special face plate to disguise any gap present between the replacement radio display and the inside edges of the dashboard display opening.

20. A kit for use in replacing an original vehicle radio mounted in a vehicle dashboard having a dashboard radio display opening and a plurality of dashboard shaft openings, the original vehicle radio having an original radio case, an original radio display fitting into the dashboard radio display opening and a plurality of original control knob shafts extending from the original radio case through the dashboard control shaft openings in the vehicle dashboard, and by which the original radio can be mounted to the dashboard, comprising:

- a replacement radio having a replacement radio case and a replacement radio display, the replacement radio display sized and positioned to fit into the smallest size of dashboard display opening in which it is expected the replacement radio will be placed;
- a plurality of replacement radio controls separate from the replacement radio case each replacement radio control having a radio control knob shaft sized and configured to fit through the dashboard shaft openings in the vehicle dashboard;
- means operatively connecting the plurality of replacement radio controls to the replacement radio in the replacement radio case;
- mounting bracket attachment means for attaching one or more replacement radio mounting brackets to the replacement radio case for securing the replacement radio in the vehicle dashboard; and
- a plurality of sets of mounting brackets, each set of mounting brackets adapted to be mounted to the replacement radio case by the means for attaching one or more replacement radio mounting brackets to the replacement radio case and each set of brackets providing different mounting positions for mounting the radio controls and the replacement radio control knob shafts so a set of mounting brackets can be selected by a user to position the replacement radio control knob shafts to extend through both the mounting brackets and the dashboard shaft openings of the dashboard in the vehicle in which the replacement radio is to be mounted.

* * * * *